United States Patent [19]
Bouevitch et al.

[11] Patent Number: 6,118,530
[45] Date of Patent: Sep. 12, 2000

[54] OPTICAL SCANNING SPECTROMETER

[76] Inventors: Oleg Bouevitch, 2336 Shanegal Crescent, Gloucester, Ontario, Canada, K1V 9P2; Paul Colbourne, 45D Woodfield Drive, Nepean, Ontario, Canada, K2G 3Y6

[21] Appl. No.: 09/313,180

[22] Filed: May 18, 1999

[51] Int. Cl.[7] .................. G01J 3/06; G01J 3/10; G01J 3/18
[52] U.S. Cl. ............................ 356/308; 356/328
[58] Field of Search ................... 356/308, 326, 356/328

[56] References Cited

U.S. PATENT DOCUMENTS

| | | | |
|---|---|---|---|
| 4,969,740 | 11/1990 | Sonobe | 356/326 |
| 4,983,039 | 1/1991 | Harada et al. | 356/328 |
| 5,438,407 | 8/1995 | Harada | 356/328 |
| 5,489,980 | 2/1996 | Anthony | 356/328 |
| 5,838,437 | 11/1998 | Miller et al. | 356/345 |

*Primary Examiner*—F. L. Evans
*Attorney, Agent, or Firm*—Neil Teitelbaum and Associates

[57] ABSTRACT

A reference system for an optical wavelength scanner, used for measuring wavelengths of radiation from an optical device. The system utilizes a wavelength reference comprising a fixed fiber Fabry-Perôt (FFP) filter in combination with a reference fiber Bragg grating (FBG) having an accurately known reflection wavelength to minimize the effects of drift and non-linearities in the scanner and to allow a simple flexure element to be used to position a dispersive grating. The wavelengths of the reference comb of the fixed FFP are determined by reference to that of the reference FBG. Then, the peaks or notches in the light intensity from the device under test are located with respect to the comb of peaks produced by the reference. In a most simple embodiment two ports are coupled so as to provide their output light to the dispersive element simultaneously and only a single collimating lens is required for collimating light from the output ports.

28 Claims, 4 Drawing Sheets

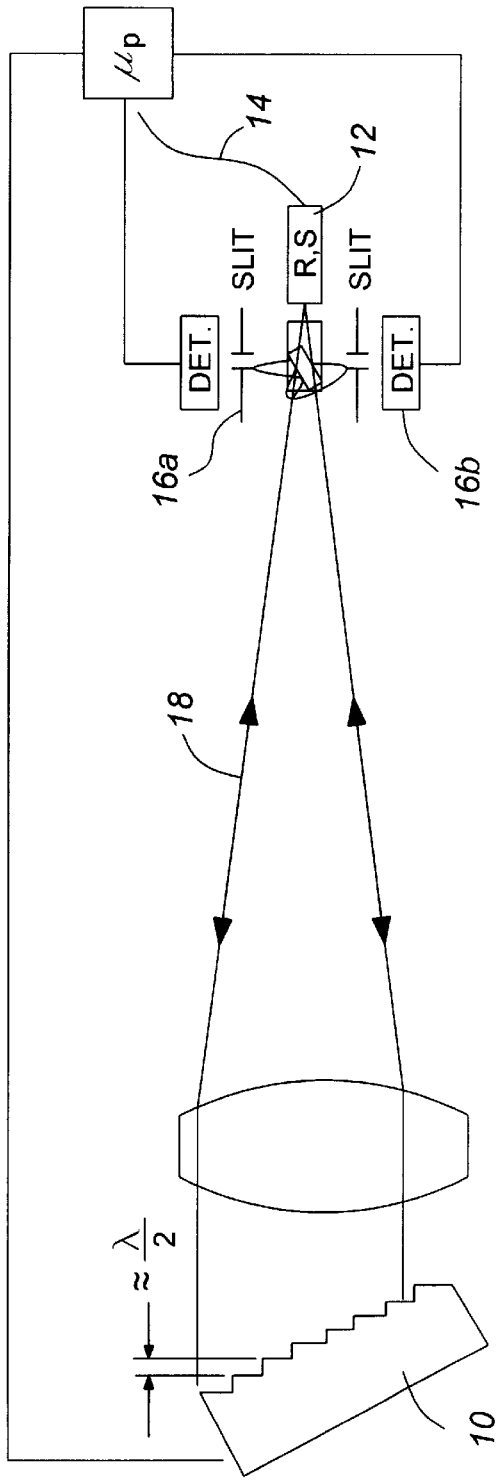
FIG. 1
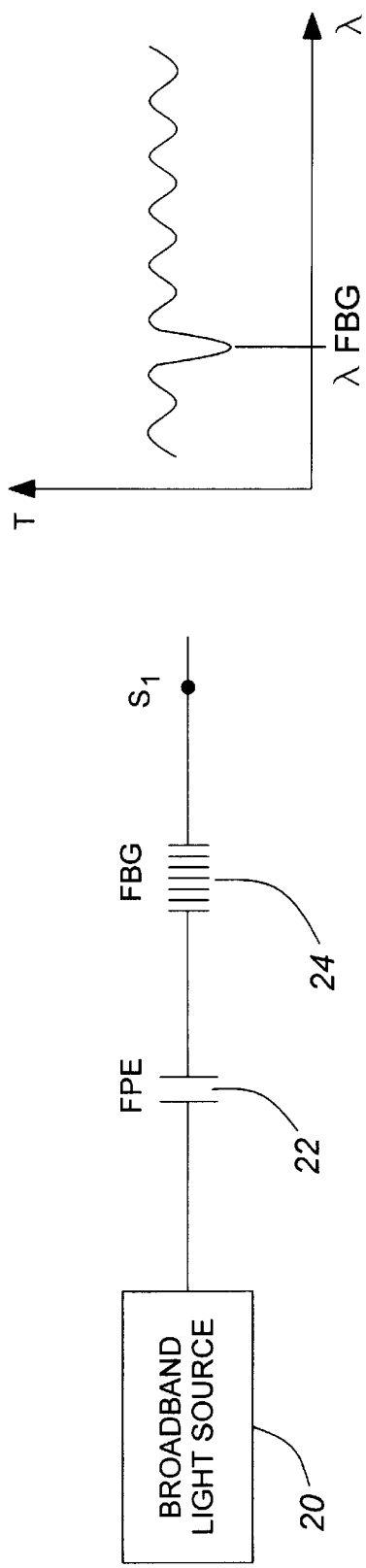
FIG. 2a
FIG. 2b

OPTICAL SCANNING SPECTROMETER

FIELD OF THE INVENTION

This invention relates to spectrometers, and more particularly, relates to spectrometers that are capable of wavelength analysis employing the use of a reference signal from which a wavelength of a test input beam is derived.

BACKGROUND OF THE INVENTION

Spectrometers function using the principle of dispersion of light, which occurs when rays of light are deviated, typically by a diffraction grating, or refracted through a prism. Diffraction gratings behave optically like a multiplicity of very narrow individual slits, which cause light rays to be deviated at angles depending upon the wavelength of those rays.

In existing spectrometers, light transmitted through a slit is dispersed using a diffraction grating or prism. The dispersed light is then imaged onto a detection focal plane, which typically contains an array of minute photosensitive elements. Most spectrometers include a collimator to make all the light rays incident on the grating or prism parallel. Collimating is necessary to make sure all the rays of the same color are dispersed at the same angle. However, current spectrometers are relatively bulky instruments since the optical ray paths tend to be fairly long. In addition, current scanning spectrometers require mechanical motion and rotate the dispersing element to scan wavelengths past the detectors. These mechanical motions are sensitive to vibrations and result in wear, which may cause alignment and/or calibration problems.

Many prior art devices used for wavelength measurement require a stable, precise light source for generating a stable beam of light having a narrow spectrum centered about a particular wavelength. For example, U.S. Pat. No. 4,989,039, incorporated herein by reference, provides and uses a mercury lamp having a wavelength of 253.7 nm as a reference light. This and other systems, which rely on, a precise reference wavelength with which some comparison is performed to determine a wavelength of an input signal significantly adds to the cost of the device. Furthermore stabilizing such light sources is difficult and costly.

Fixed fiber Fabry-Perot (fixed FFP) filters can be used as accurate wavelength references for the calibration of optical spectrum analyzers (OSA) to increase both accuracy and resolution of measurements. Although fixed FFP filters produce multiple, very accurately spaced, wavelengths (i.e. a comb of peaks), a consistent problem has been the difficulty of accurately identifying an individual wavelength among the multiple wavelengths produced.

Fiber Fabry-Perot tunable filters (FFP-TF) have been successful commercialization for use in he first wavelength detection multiplexing (WDM) systems and have demonstrated robust and field-worthy operation. WDM systems have rapidly developed moving to 8, 16 and 32 (and higher) wavelength systems using other less expensive demultiplex technology. These developments have made interrogator systems for accurately measuring the wavelength response of passive fiber optics devices possible. Tunable FFP filters can be used as the needed OSA component in such dense WDM, if suitable methods for wavelength referencing and calibration can be found. For dense WDM systems, the accuracy of absolute wavelength measurements is preferably about 0.5 to about 0.1 nm or higher, power measurements are preferably about 0.1 dB and signal-to-noise measurements are preferably about 1 dB or less. Fixed FFPs and FFP-TFs are described, for example, in U.S. Pat. Nos. 5,212,745; 5,212,746; 5,289,552; 5,375,181; 5,422,970; 5,509,093 and 5,563,973, all of which are incorporated by reference in their entireties herein, particularly for their disclosure of the structures and operation of these filters.

In-fiber Bragg gratings (FBGs) have been used in fiber optic sensors for strain and temperature measurements. These sensing techniques depend on the ability to accurately measure the wavelengths of light reflected or transmitted by FBGs in a sensor fiber.

Fiber Bragg gratings can produce a narrow-band response around a single wavelength (reflecting a narrow-band peak or passing the illuminating spectrum with a narrow-band notch or hole). Dopants are used to increase the index of refraction in the cores of optical fibers are photosensitive. By exposing a single-mode fiber to interfering beams of UV light or through a suitable mask, a diffraction pattern can be written into the core that reflects a single narrow-band wavelength of light. The resulting fiber Bragg grating (FBG) passes all other wavelengths carried by the single-mode fiber and reflects almost all (up to 99.9%) of the light that meets the Bragg condition ($\lambda=2s$, the Bragg reflection wavelength), where s is the spacing of the grating. If the FBG is mounted on a structure (typically a structure much larger than the grating itself), then the spacing of the grating and the corresponding reflected wavelength of the FBG are affected by and can be used to sense strain, temperature, pressure, etc. in the structure depending on the mounting configuration. A sensor system is constructed by creating a number of FBGs (typically each of different Bragg wavelength) spaced along a single optical fiber to generate a highly multiplexed sensor system reflecting at different wavelengths. Sensor systems can also be constructed in which multiple FBGs (of different wavelength) are created in the same location on the fiber.

FBGs have recently become widely commercially available at relatively low cost and are projected to be extensively used in multi-wavelength telecommunications systems. Thus, there is a growing need for devices and methods for interrogation of sensor, telecommunication and related systems that employ FBGs. In particular, there is a need for devices and methods that provide precise, accurate and reproducible determination of wavelengths reflected (or alternatively of the notches transmitted) by FBGs.

U.S. Pat. No. 5,838,437 in the names of Miller et al, entitled Reference System for Optical Devices Including Optical Scanners and Spectrum Analyzers, incorporated herein by reference, hereafter called the '437 patent, discloses an optical spectrum analyzer which utilizes a fixed Fabry-Perôt etalon and a Bragg grating, as does the instant invention. Notwithstanding, one drawback to the '437 patent is that it does not provide a real-time or near real-time analysis of an optical signal to be analyzed. For example, it is a goal of the instant invention, to provide an optical signal to the device and to obtain a real-time or nearly real-time indication of its wavelength. By real-time, what is meant is not real-time processing but simultaneous receipt upon the diffraction grating or dispersive element of a reference signal and the test signal. The '437 reference in contrast to the instant invention ensures that a particular condition must be met in the process of analyzing an optical signal; In the '437 reference switching is invoked between the reference signal and the signal under test. When one signal is utilized, the other is not, and vice versa. Hence the system switches or alternates between the reference signal and the test signal but does not simultaneously utilize these signals. Advantageously, in the instant invention it is essential for the signal under test and the reference signal to be simultaneously impinging on the dispersive grating. By so doing, preferably the same conditions, i.e. substantially same optical path and grating angle are experienced by both signals, even in the presence of unwanted vibrations or other severe conditions.

In contrast to the '437 reference, the instant invention simultaneously provides a reference signal and the test signal and utilizes the reference signal in a real-time manner to determine the wavelength of the test signal. Hence, there is no delay between the receipt of the reference and test signals by their respective detectors, and the two signals simultaneously impinge upon a same grating or dispersive element; it is preferable but not essential that the two signals impinge at substantially the same angles of incidence.

In order to process the test signal and the reference signal through the same spectral dispersion element, the two signals are both disposed adjacent one another, more specifically, stacked on top of one another, and directed to a focusing means in the form of a single or plural lenses or concave mirrors such that they use the same dispersion element simultaneously.

Advantageously, the present invention is relatively inexpensive to manufacture and allows an inexpensive flexure element to be used as a means of moving the diffraction grating. The flexure element need not be linear in its movement however must be monotonic within a working range.

Advantageously, since the wavelength tracking optics are reliable, a simple, inexpensive movement can be used while obtaining accuracy of wavelength measurement.

SUMMARY OF THE INVENTION

In accordance with the invention there is provided, a spectrometer comprising: a dispersive grating including means for controllably, monotonically, moving the grating into a plurality of different positions so that a beam launched from a fixed immovable port directed at the grating is incident thereon at different angles of incidence as the grating is moved monotonically;

a first fixed port for launching a signal to be analyzed to the dispersive grating and a second separate fixed port for simultaneously launching a broadband test signal to the dispersive grating;

means for determining a wavelength of the signal to be analyzed in dependence upon an identifiable wavelength within the broadband light source after the signal to be analyzed and the broadband test signal are simultaneously launched into the grating.

In accordance with the invention, there is provided, a spectrometer for analyzing a sample signal comprising:

a reference signal generator for generating a composite optical signal with an amplitude that varies periodically with wavelength, the composite optical signal having at a target wavelength a discernible a-periodic variation in amplitude from the periodic signal;

a collimating lens disposed to receive and collimate the composite optical signal; output ports fixedly disposed adjacent one another so that beams directed outward from the output ports are directed to the collimating lens, a first of the output ports for receiving and transmitting the composite optical signal to the collimating lens, a second of the output ports for receiving and transmitting the sample signal to the collimating lens;

a dispersion-type spectral element disposed to receive the composite optical signal and the sample signal from the collimating lens;

and a first detector and a second detector, disposed at different locations to receive a portion of a dispersed spectrum provided by the dispersion-type spectral element; and, processing means for determining the wavelength of the sample signal in dependence upon the composite optical signal and orientation of the dispersion-type spectral element.

In accordance with the invention there is further provided, a spectrometer comprising:

at least a port for launching a signal to be analyzed to a dispersive grating and for simultaneously launching a broadband test signal to the dispersive grating;

means for determining a wavelength of the signal to be analyzed in dependence upon an identifiable wavelength within the broadband light source after the signal to be analyzed and the broadband test signal are simultaneously launched into the grating.

In accordance with another aspect of the invention there is provided a method of analyzing the wavelength of an optical signal comprising:

simultaneously launching the signal to be analyzed and a broadband test signal at a dispersive grating, the broadband test signal having a periodic amplitude response and having a target wavelength thereon where the amplitude response is identifiable and different than that of the periodically varying amplitude of the periodic signal;

monotonically, moving the grating into a plurality of different positions so that the test signal and the signal to be analyzed simultaneously launched from a fixed immovable ports directed at the grating are incident thereon at different angles of incidence as the grating is moved monotonically; and, determining a wavelength of the signal to be analyzed in dependence upon the identifiable wavelength within the broadband light source after the signal to be analyzed and the broadband test signal are simultaneously launched into the grating.

In accordance with another aspect of the invention there is provided, a spectrometer for analyzing an optical signal, comprising:

a wavelength dispersive element;

a first and a second output port secured in a spaced-apart fixed relationship one with respect to the other, the first output port for providing to the wavelength dispersive element a reference signal which is substantially periodic having at least an a-periodic identifiable feature therein at a particular wavelength, the second output port for providing the optical signal for analysis to the dispersive element in simultaneity with the first output port providing the reference signal;

a first and a second detector secured in a spaced-apart fixed relationship one with respect to the other and disposed to receive at least a portion of the reference signal and the optical signal for analysis, wherein light launched into the first and second output ports directed to each detector respectively after being incident upon the wavelength dispersive element traverses a pair of optical paths each defining an angle at dispersive element; means for altering the optical path to alter the angle; and, means for determining a wavelength of the signal to be analyzed in dependence upon an identifiable wavelength within the broadband light source after the signal to be analyzed and the broadband test signal are simultaneously launched into the wavelength dispersive element.

Advantageously, this invention utilizes an inexpensive and readily available broadband light source to provide a signal from which a relatively stable test signal is derived, by using a periodic filter and a means of relatively identifying any period within that periodic signal. This provides a relatively inexpensive, stable reference signal from which to measure the wavelength of interest.

BRIEF DESCRIPTION OF THE DRAWINGS.

FIG. 1 is a top view of the spectrometer in accordance with the invention;

FIG. 2a is a circuit diagram of the circuitry required to provide a test signal $S_1$ used as a reference signal;

FIG. 2b is a graph of intensity versus wavelength of the signal $S_1$;

DETAILED DESCRIPTION

Figure 3:
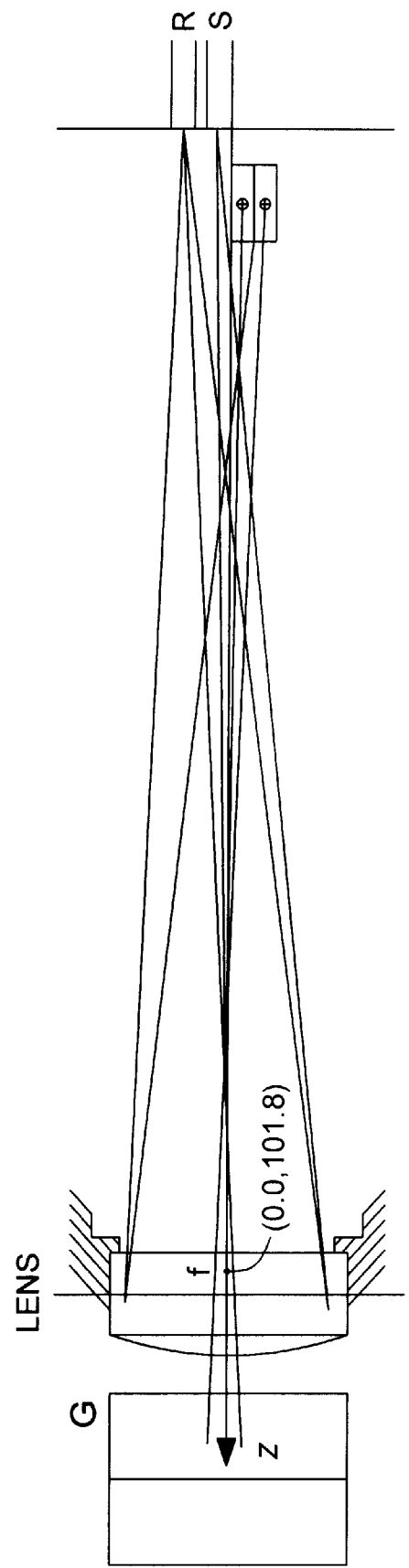
FIG. 3 is a side view of the spectrometer shown in FIG. 1.

FIG. 1 shows a top view of a spectrometer in accordance with an embodiment of this invention. Two ports R and S are disposed one on top of the other, port S is not visible and below port R in this top view; both ports have their output ends directed to dispersion grating 10. A collimating lens 12 is disposed between the grating and the ports R and S for collimating light received from the ports in the form of overlapping collimated beams at the grating 10. The ports R and S are each conveniently formed by coupling a respective optical fibre 14 end with a half-pitch graded index (GRIN) lens. In this instance, the half-pitch lens provides a means of conveniently and physically terminating and fixing the optical fibre end securely.

In FIG. 1 the outgoing and returning beam 18 is depicted by arrows in an outgoing direction and in an incoming returning direction. In the outgoing direction a reference signal beam R is launched from the GRIN lens port R and below looking downward on this plan view the signal beam S having a wavelength λ to be determined by the spectrometer is launched from the GRIN lens port S. The two outgoing beams impinge the grating simultaneously. It is also preferred that the beams impinge at a same angle of incidence and that the two beams occupy a substantially same, preferably inner region of the lens. It is also preferred that the two beams R and S are incident upon the lens 12 at substantially the same low angle of incidence, i.e. preferably near normal angle of incidence so as to reduce aberrations caused by light impinging upon the lens at high angles of incidence. In front and below the ports R and S are two orthogonally disposed mirrors one on top of the other, spaced a distance equivalent to the distance between the centres of the two ports R and S and oriented at 45 degrees to the longitudinal axes of the GRIN lenses of the ports R and S. The mirrors must be low enough below the ports R and S so as to not interfere with light launched from the ports to the grating 10, however it is preferred for the mirrors to be situated about the ports. This is shown in more detail in FIG. 3, 3a, and 3b. Adjacent to the mirrors and on opposite sides of the spectrometer are two detectors 16a and 16b having a slit disposed in front of each detector for filtering out unwanted wavelengths of light and ensuring that only a narrow band of light will reach each detector. The detectors 16a and 16b are disposed at different heights so that they optimally capture and detect the return beams S and R respectively. From the geometry and configuration shown in FIG. 3 it becomes apparent that the mirror $M_R$ is below the mirror $M_S$ for receiving the beams launched from the ports R and S respectively. Since precise reliable wavelength information is available from this configuration essentially in real-time or near real-time an inexpensive long-life flexure movement can be provided to move/rotate the grating 10 monotonically.

Turning now to FIG. 2a, an optical circuit is shown, wherein a reference signal S1 is shown having a broad band light source 20, such as a broadband light emitting light emitting diode (LED) for providing a spectrum comprising a plurality of wavelengths of light in the range of wavelength of light to be analyzed by the system. Light emitted by the LED 20 is coupled using conventional means, such as a suitable lens or lenses, into an optical fibre. A fixed periodic filter, such as a Fabry-Perôt etalon (FPE or FFP) 22, is disposed to receive the light propagating along the optical fibre, and filters the light so as to provide a signal having a sinusoidal varying amplitude with wavelength. This signal is then provided to an in-line fibre Bragg grating (FBG) 24 which reflects a narrow predetermined wavelength backwards; or stated differently, the Bragg grating transmits substantially all wavelengths but a narrow band of wavelengths which are reflected. Hence, the circuit shown if FIG. 2a with relatively low cost components provides a relatively stable periodic signal with an identifiable target reference wavelength provided by the FBG.

Referring now to FIG. 3 a side view of the spectrometer is shown wherein the ports R and S are disposed one over the other. The mirrors $M_R$ and $M_S$ are also shown stacked such that $M_R$ is below $M_S$. Light launched from port R is directed through the collimating lens and is provided to the grating 10 as a collimated beam. After the spectrum is spread into wavelengths spatially, a portion of the spread spectrum corresponding to a narrow wavelength band is provided to the detector 16b via mirror $M_R$. The input signal beam deflects off the grating and is detected by the detector 16a after being deflected by the mirror $M_S$ at one position as the grating scanning by flexing the flexure element supporting the grating. By correlating the occurrence with a "hit", the detector detecting the input signal beam and the specific period of the Fabry-Perôt etalon using the Bragg target as a reference, the wavelength of the input signal beam is determine d. The operation of the invention can be understood as follows. The first periodic reference peak is at wavelength λ1; the second peak after detecting the presence of the a-periodic Bragg reflection wavelength is λ2; and the nth peak is at wavelength λn referenced to the Bragg reflection wavelength. Hence the microprocessor coupled to the detectors counts each peak after the first peak at λ1 to coarsely establish the wavelength of the optical signal propagating simultaneously with the reference signal. At any other moment in time during scanning when the signal to be measured doesn't correspond exactly with a detected peak, linear interpolation is used to establish more precisely the wavelength of the signal. For example if the signal under test is established to be between the n-4$^{th}$ and n-3$^{rd}$ peak linear interpolation between these two known wavelengths provides a reasonably accuracy approximation of the wavelength of interest. This provides relatively good results since the movement of the dispersive element between two peak (or valleys) is substantially linear.

Figure 3B:
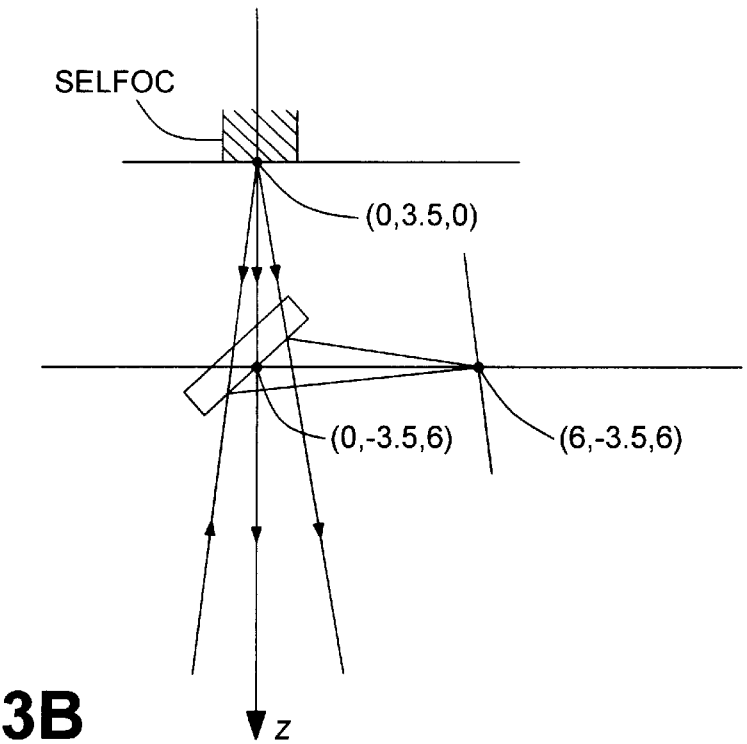
FIG. 3b is a top view of the mirror corresponding to the reference channel.

FIGS. 3a, and 3b are top views of the mirrors and show in detail their orientation with respect the circuit of FIG. 3. The mirror shown in FIG. 3a for deflecting the reference channel or signal is shown to have coordinates (6, −3.5, 6) corresponding to (x, y, z) with respect to the port R having coordinates (0, 3.5, 6). The corresponding slit is disposed a location corresponding to coordinates (6, −3.5, 6). The mirror shown in FIG. 3b for deflecting the signal channel is shown to have coordinates (6, −3.5, 6) corresponding to (x, y, z) with respect to the port R having coordinates (0, 3.5, 0). The corresponding slit is at location (−6, −1, 6).

Figure 3C:
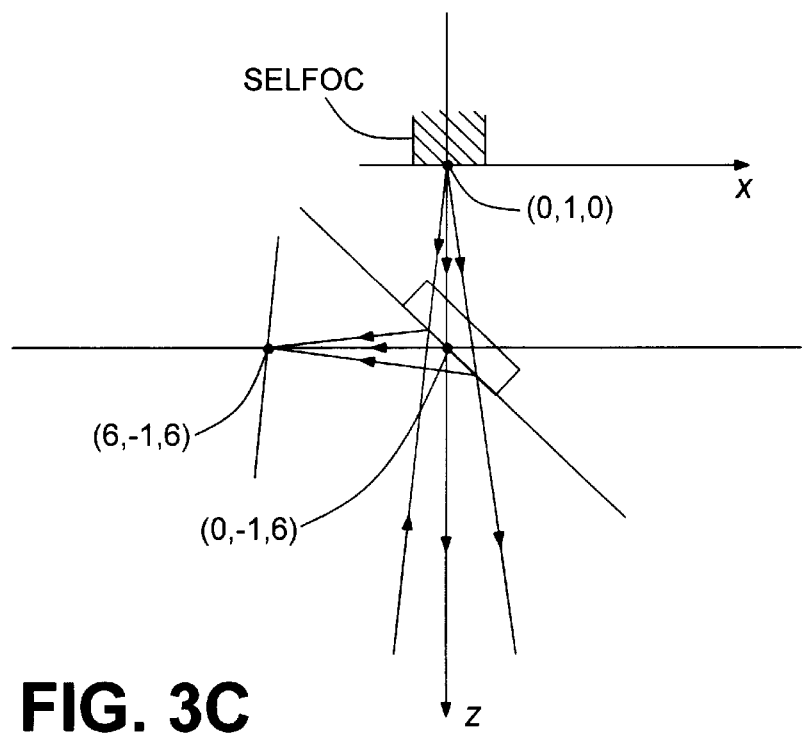
FIG. 3c is a top view of the mirror corresponding to the signal channel.

FIG. 3c illustrates a port, for example port R or port S and its components. An optical fibre carrying the reference signal or the signal under test is held securely in an optical fibre tube which is coupled to a 0.5 pitch GRIN lens. The outer end face of the lens is used as a port from which the beam is launched.

Figure 4:
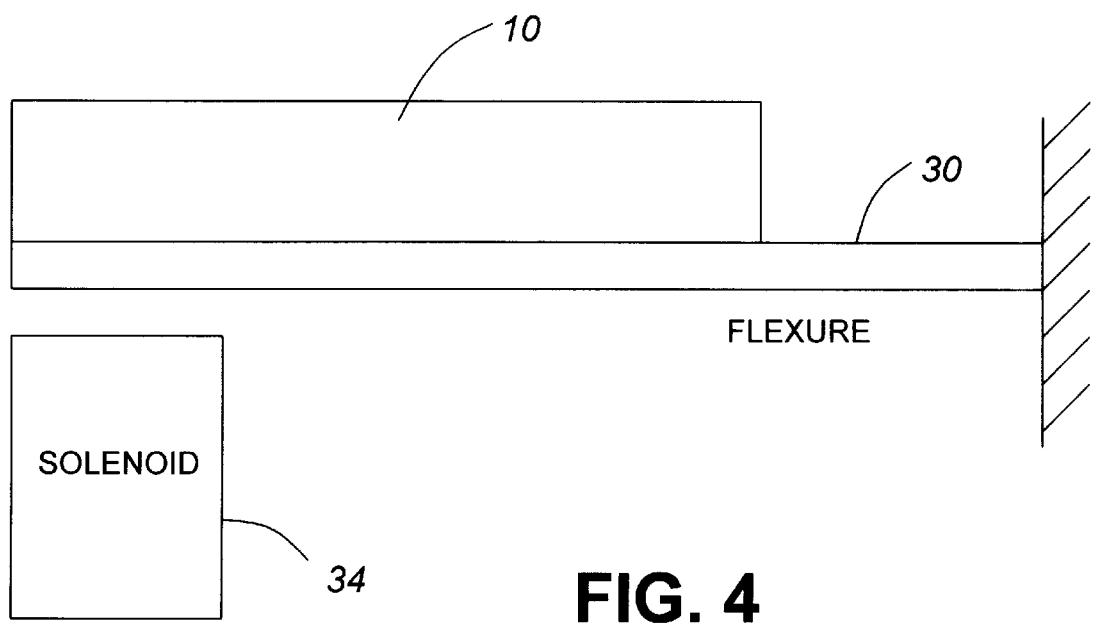
FIG. 4 is a side view of the grating supported by a flexure element and movement in accordance with this invention.

In FIG. 4 the grating 10 is secured to a flexure element 30 driven by a solenoid 34; This arrangement is frictionless and a flexure of this type can withstand billions of bends if these are far enough from the elastic limit, this provides a simple inexpensive movement to vary the angle of the supported grating. Further, the optical spectrum analyzer is a dual channel optical spectrum analyzer, one channels being supplied with an internal optical signal, the reference signal, that is very stable with respect to wavelength. In this manner the current wavelength or angle of the flexure tilt associated with the wavelength can be determined for any movement of time during the sweep. This eliminates the need to bring the flexure at a predetermined position, and in addition, provides a permanent internal wavelength calibration source.

In another embodiment additional slits and detectors can be provided to broaden the range of the detector without broadening the mechanical scanning range.

Numerous other embodiments may be envisaged without departing from the spirit and scope of the invention. For example, the dispersive element may be a diffraction grating or alternatively may be an etalon having a sufficient number of ports. The collimator may be a lens or alternatively may be a mirror having a curvature that will provide suitable collimation.

In the embodiments described heretofore, the configuration has been limited to an arrangement wherein the output ports are fixed and the grating is movable; however, it is within the scope of this invention to provide a two channel system wherein the two output ports are movable as a ganged pair of ports; by so moving the ports and providing a fixed dispersive element such as a grating, the incident angle can be varied. Alternatively, the output ports and the grating can be fixed and a pair of movable ganged detectors can be provided. Yet alternatively, the beams after dispersion by the dispersive element can be steered by a movable mirror to effect scanning.

What we claim is:

1. A spectrometer for analyzing a sample signal comprising:
   a reference signal generator for generating a composite optical signal with an amplitude that varies periodically with wavelength, the composite optical signal having at a target wavelength a discernible a-periodic variation in amplitude from the periodic signal;
   a collimating lens disposed to receive and collimate the composite optical signal;
   output ports fixedly disposed so that beams directed outward from the output ports are directed to the collimating lens, a first of the output ports for receiving and transmitting the composite optical signal to the collimating lens, a second of the output ports for receiving and transmitting the sample signal to the collimating lens;
   a dispersive spectral element disposed to receive the composite optical signal and the sample signal from the collimating lens, an angle between the composite optical signal and the dispersive spectral element being variable and a same angle between the sample signal and the dispersive spectral element being variable;
   and a first detector and a second detector, disposed at different locations, the first detector to receive a portion of a dispersed spectrum provided by the dispersive spectral element, the second detector to detect the presence of the sample signal; and,
   processing means for determining the wavelength of the sample signal in dependence upon the composite optical signal and orientation of the dispersive spectral element.

2. A spectrometer as defined in claim 1, wherein the dispersive spectral element is movable and is coupled to a flexure element for supporting said dispersive spectral element and allowing movement with a range of flexing positions in a frictionless manner.

3. A reference system for measuring wavelengths of radiation from an optical beam, comprising:
   a filter having a periodic output response to broadband light and a Bragg grating optically coupled thereto, for generating a composite optical signal for use as a reference signal in determining the wavelength of the optical beam;
   a collimating lens;
   a first optical port for receiving the reference signal and for providing the reference signal to the collimating lens; and a second optical port distinct from the first optical port for receiving the optical beam and for simultaneously providing the optical beam collimating lens;
   a first and a second light receiving port disposed to simultaneously receive at least some dispersed light corresponding to the reference signal and the optical beam respectively; and,
   a light dispersive element positionable in a plurality of positions so as to vary the angle of the light propagating between the first and second optical ports and the first and second light receiving ports; and,
   processing means for determining the wavelength of the optical beam in dependence upon light simultaneously received at the first and second light receiving ports.

4. A reference system for measuring wavelengths of radiation from an optical beam as defined in claim 3 wherein the first and second light receiving ports comprise detectors for detecting the intensity of light incident thereon.

5. A reference system for measuring wavelengths of light as defined in claim 3, wherein the positionable dispersive element is mounted upon a flexure element to provide frictionless movement in a plurality of positions.

6. A reference system for measuring wavelengths of radiation from an optical beam, comprising:
   a filter having a periodic output response to broadband light and a Bragg grating optically coupled thereto for generating a composite optical signal for use as a reference signal in determining the wavelength of the optical beam;

a light dispersive element positionable in a plurality of positions so as to vary the angle of the light incident thereon;

a first optical port for receiving the reference signal and for providing the reference signal to the light dispersive element; and a second optical port distinct from the first optical port for receiving the optical beam and for simultaneously providing the optical beam to the light dispersive element;

a first and a second light receiving port disposed to simultaneously receive at least some dispersed light corresponding to the reference signal and the optical beam respectively;

collimation means for collimating light directed between the dispersive element and said ports; and, processing means for determining the wavelength of the optical beam in dependence upon light simultaneously received at the first and second light receiving ports.

7. A reference system as defined in claim 6, wherein the collimation means comprises a lens.

8. A reference system as defined in claim 6, wherein the collimation means consists of a single collimating lens.

9. A reference system as defined in claim 8 wherein the positionable light dispersive element is supported by a flexure element and including means for flexing the flexure element and simultaneously positioning the light dispersive element in a frictionless manner.

10. A spectrometer comprising:

a wavelength dispersive element including means for controllably, monotonically, moving a grating into a plurality of different positions so that a beam launched from a fixed immovable port directed at the dispersive element is incident thereon at different angles of incidence as the dispersive element is moved monotonically;

a first fixed port for launching a signal to be analyzed to the dispersive element and a second separate fixed port for simultaneously launching a broadband test signal to the dispersive element;

means for determining a wavelength of the signal to be analyzed in dependence upon an identifiable wavelength within a broadband light source after the signal to be analyzed and the broadband test signal are simultaneously launched into the wavelength dispersive element.

11. A spectrometer as defined in claim 10, wherein the dispersive element is a grating and wherein the means for controllably moving the dispersive grating includes a flexure stage capable of being flexed in a range of positions so as to provide the different angles of incidence.

12. A spectrometer as defined in claim 10 wherein the means for determining the wavelength of the signal to be analyzed includes two separate detectors, one for detecting a portion of the broadband test signal after it has undergone dispersion by the dispersive element and the other for detecting a portion of the signal to be analyzed after it has been redirected by the wavelength dispersive element.

13. A spectrometer as defined in claim 11 wherein the two separate ports and the grating are disposed in such a manner so as to allow two beams exiting said ports and directed to the dispersive grating to be incident upon a receiving face of the grating at a same incident angle.

14. A spectrometer as defined in claim 13 further comprising a collimating lens disposed between the two separate ports and the grating, for providing collimated light to the grating.

15. A spectrometer as defined in claim 10 wherein the dispersive element is a grating, said spectrometer further comprising a broad band light source and a periodic filter disposed to receive light form the broadband light source, said periodic filter for generating a periodic signal after receiving broad band light from the broad band light source, said filter being optically coupled with a Bragg grating for providing an identifiable wavelength relating to a period of the Bragg grating within the periodic signal.

16. A spectrometer as defined in claim 15, further comprising means for determining a relationship between the identifiable wavelength and a particular period of the periodic output response signal so that a wavelength range of the particular period can be established.

17. A spectrometer as defined in claim 16, further comprising means for determining a wavelength within the particular period, which corresponds to the signal to be analyzed.

18. A spectrometer as defined in claim 16 wherein the means for controllably moving the grating into a plurality of positions comprises a flexure element for supporting the grating.

19. A spectrometer comprising, a dispersive optical element for spatially dispersing a beam of light into wavelength bands, each wavelength band being disposed at a different location in space, each band comprising one or more wavelengths of light;

a first port for launching a test signal to be analyzed into the dispersive element;

a second port disposed at a different location for launching a test reference signal into the dispersive element, the test reference signal comprising a band of wavelengths of light within a range of wavelengths to be analyzed by the spectrometer, the first and second ports disposed such that light exiting said ports simultaneously is simultaneously incident upon the dispersive element;

a broad band light source for providing the test reference signal which comprises a continuum of wavelengths of light within the range of wavelengths to be analyzed by the spectrometer;

a periodic filter disposed to receive the test reference signal; and, a referencing optical element optically coupled with the periodic filter to provide a discernable target wavelength from an otherwise periodic output response within the range of wavelengths of the broad band light source when the test reference signal is provided to the periodic filter; and, means for determining a correspondence between the target wavelength and the wavelength within at least predetermined limits of the test signal.

20. A spectrometer as defined in claim 19 wherein the dispersive element is controllably monotonically movable within a range of movement.

21. A spectrometer as defined in claim 20 wherein the dispersive element is mounted on a flexible member such that the dispersive element can be moved in the absence of friction by flexing the flexure member monotonically within a working range.

22. A spectrometer as defined in claim 19, wherein the means for determining a correspondence between the target wavelength and the wavelength within predetermined limits provides an indication of which particular period of the periodic output response that is output from an etalon corresponds to the wavelength of the signal to be analyzed.

23. A spectrometer as defined in claim 19, wherein the dispersive optical element is movable and is coupled to a flexure element for supporting said element and allowing movement with a range of flexing positions in a frictionless manner.

24. A method of analyzing the wavelength of an optical signal comprising:
   simultaneously launching the signal to be analyzed and a broadband test signal at a dispersive grating, the broadband test signal having a periodic amplitude response and having a target wavelength thereon where the amplitude response is identifiable and different than that of the periodically varying amplitude of the periodic signal;
   monotonically, moving the grating into a plurality of different positions so that the test signal and the signal to be analyzed simultaneously launched from a fixed immovable ports directed at the grating are incident thereon at different angles of incidence as the grating is moved monotonically; and,
   determining a wavelength of the signal to be analyzed in dependence upon the identifiable wavelength within the broadband light source after the signal to be analyzed and the broadband test signal are simultaneously launched into the grating.

25. A spectrometer for analyzing an optical signal, comprising:
   a wavelength dispersive element;
   a first and a second output port secured in a spaced-apart fixed relationship one with respect to the other, the first output port for providing to the wavelength dispersive element a reference signal which is substantially periodic having at least an a-periodic identifiable feature therein at a particular wavelength, the second output port for providing the optical signal for analysis to the dispersive element in simultaneity with the first output port providing the reference signal;
   a first and a second detector secured in a spaced-apart fixed relationship one with respect to the other and disposed to receive at least a portion of the reference signal and the optical signal for analysis, wherein light launched into the first and second output ports directed to each detector respectively after being incident upon the wavelength dispersive element traverses a pair of optical paths each defining an angle at dispersive element;
   means for altering the optical path to alter the angle; and,
   means for determining a wavelength of the signal to be analyzed in dependence upon an identifiable wavelength within the broadband light source after the signal to be analyzed and the broadband test signal are simultaneously launched into the wavelength dispersive element.

26. A spectrometer as defined in claim 25 wherein the means for altering the optical path to alter the angle comprises a flexure stage for supporting the wavelength dispersive element and for providing controlled rotation of a mirror.

27. A spectrometer as defined in claim 25 wherein the means for altering the optical path to alter the angle comprises a flexure stage.

28. A spectrometer as defined in claim 25 wherein at least one of the first and second output ports, the detectors and the grating are controllably movable.

* * * * *

UNITED STATES PATENT AND TRADEMARK OFFICE
CERTIFICATE OF CORRECTION

PATENT NO.    : 6,118,530
DATED         : September 12, 2000
INVENTOR(S)   : Bouevitch et al.

It is certified that error appears in the above-identified patent and that said Letters Patent is hereby corrected as shown below:

Column 1,
Line 53, "use in he" should read -- use in the --

Column 7,
Line 10, "(6, -3.5, 6) should read -- (0, -3.5, 6) --
Line 12, "(0, 3.5, 6) should read -- (0, 3.5, 0) --
Line 15, "(6, -3.5, 6) should read -- 0, -1, 6) --
Line 16, "port R" should read -- port S --
Line 16, "(0, 3.5, 0) should read -- (0, 1, 0) --

Claim 15,
Line 4, "light form the" should read -- light from the --

Claim 24,
Line 17, "from a fixed" should read -- from fixed --.

Signed and Sealed this

Fifth Day of March, 2002

Attest:

JAMES E. ROGAN
*Attesting Officer*     *Director of the United States Patent and Trademark Office*